United States Patent [19]

Heinen

[11] Patent Number: 4,538,389
[45] Date of Patent: Sep. 3, 1985

[54] FIRE-BREAK

[75] Inventor: Hans-Dieter Heinen, Malmedy, Belgium

[73] Assignee: Intellectual Trade CY S.A., Luxembourg, Luxembourg

[21] Appl. No.: 378,306

[22] Filed: May 14, 1982

[30] Foreign Application Priority Data

May 18, 1981 [LU] Luxembourg .............................. 83374
Jun. 3, 1981 [LU] Luxembourg .............................. 83410

[51] Int. Cl.³ ........................ E04H 9/00; F16K 17/36
[52] U.S. Cl. ....................................... 52/221; 52/232; 137/75
[58] Field of Search ................... 285/56, 192; 52/232, 52/221, 220; 137/75

[56] References Cited

U.S. PATENT DOCUMENTS

| 4,061,344 | 12/1977 | Bradley et al. | 52/232 |
| 4,086,736 | 5/1978 | Landrigan | 285/192 |
| 4,093,818 | 6/1978 | Thwaites et al. | 52/232 |
| 4,109,423 | 8/1978 | Perrain | 52/232 |
| 4,136,707 | 1/1979 | Gaillot et al. | 52/232 |
| 4,237,667 | 12/1980 | Pallucci et al. | 285/192 |
| 4,249,353 | 2/1981 | Berry | 52/232 |
| 4,302,917 | 12/1981 | Fermvik et al. | 52/221 |
| 4,307,546 | 12/1981 | Dolder | 52/232 |
| 4,363,199 | 12/1982 | Kucheria et al. | 52/221 |

FOREIGN PATENT DOCUMENTS

| 74013 | 5/1947 | Norway | 285/192 |
| 1581266 | 12/1980 | United Kingdom | 285/192 |

Primary Examiner—James L. Ridgill, Jr.
Attorney, Agent, or Firm—Blum Kaplan Friedman Silberman & Beran

[57] ABSTRACT

There is described a fire-break for passing at least one hollow element such as pipe, sleeve, tube, through a building wall, notably a partition or ceiling, which comprises a flange from substantially incombustible material which is mounted around said element.

12 Claims, 4 Drawing Figures

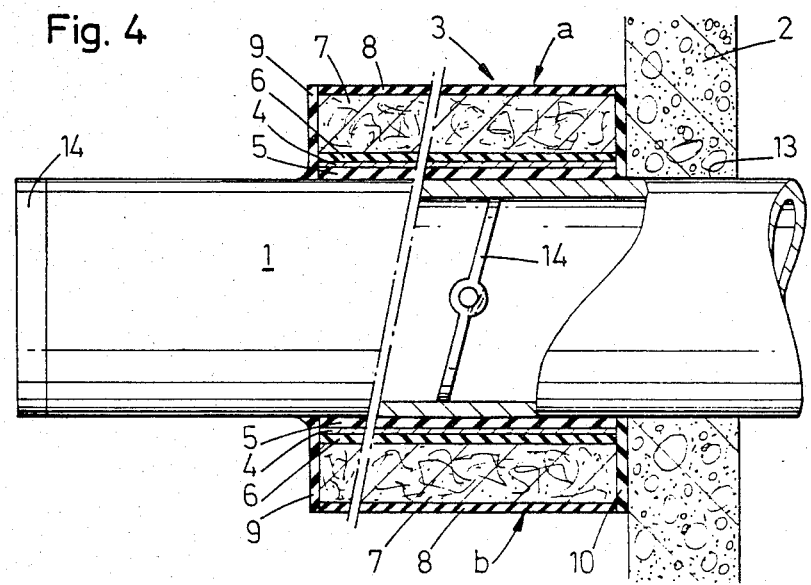

FIRE-BREAK

This invention relates to a fire-break for passing at least one hollow element, such as pipe, duct, tube through a building wall, notably apartition or ceiling.

The means known generally up to now to prevent a fire spreading through a wall where such a hollow element passes through, comprise using a choking device which essentially comprises a heat-expanding product, applied about the hollow element to exert thereon a radial pressure. Said pressure should be strong enough to crush and choke the element which is softened by heat.

Such a device requires relatively much workpower and is only suitable for very specific cases. The elements should notably be made from a material with a relatively low softening point, such as a relatively thin-walled thermoplastic material with a diameter smaller than 20 cm. Moreover such a device requires some time for the expanding product to choke the element.

An essential object of the invention is to provide a fire-break allowing to obviate such drawbacks and bringing a very efficient solution for every type of hollow element.

For this purpose according to the invention, the fire-break comprises a flange from substantially incombustible material which is mounted around said element.

Advantageously said flange comprises at least one baffle from a substantially gas-tight material which conducts heat, which has a melting point lower than 900° C. and preferably lower than 650° C., which also extends around the hollow element.

According to a particular embodiment of the invention, said flange is mounted against the outer surface of the hollow element passing through the wall.

For passing through a wall an element which might be subjected to relatively substantial lengthwise and/or cross-wise displacements and/or expansions, notably a steel tube inside which flows a varying-temperature fluid, or a tube with some length which is subjected to an outer temperature varying strongly, made from a material having a relatively high expansion rate and having a particular geometrical shape, said flange preferably extends some distance away about said element to let the element move and expand freely along lengthwise and cross-wise directions inside the flange.

More particularly in said latter embodiment, the fire-break according to the invention comprises at least one flexible, compressible plug, such as a diaphragm made from a substantially incombustible, gas-tight material, which is arranged about said element, between the element and the flange.

Other details and features of the invention will stand out from the following description, given by way of non limitative example and with reference to the accompanying drawings, in which:

FIG. 4 is a lengthwise section with parts broken away of a fire-break in a third embodiment of the invention.

In the figures, the same reference numerals pertain to similar elements.

Figure 1:
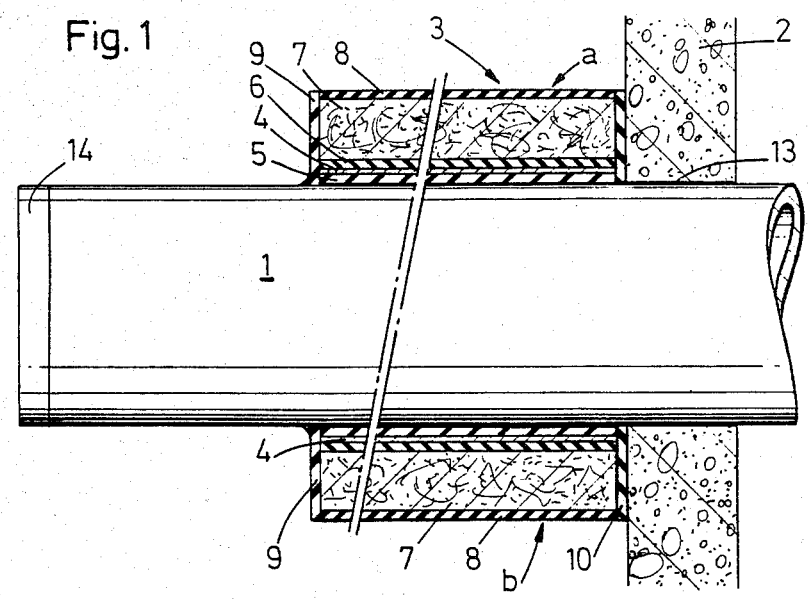
FIG. 1 is a lengthwise section view with parts broken away, of a fire-break according to the invention, as mounted around a plastic pipe.

The invention generally pertains to a fire-break for passing at least one hollow element 1 such as pipe, duct, tube, through a building wall 2, notably a partition or ceiling, which comprises at least on the one side of wall 2, a flange 3 from a subtantially incombustible material, which is mounted around said element 1 and applied against wall 2.

Said flange 3 is advantageously comprised of a sleeve on the basis of incombustible fibers, such as a rock-wool sleeve, which is formed to make mounting thereof easier, by two discrete portions a and b which are coated inside and outside with a fire-proof compound and assembled around said element 1.

The flange width preferably lies between 2 and 6 times the inner diameter of hollow element 1, while the flange thickness lies between 3 and 10 cm.

Moreover the flange comprises in a particular embodiment of the invention, at least one baffle 4 from a substantially gas-tight material, which conducts heat and has a melting point lower than 900° C. and preferably lower than 650° C.

Said baffle 4 extends about the hollow element between two layers from fire-proof compound 5 and 6, in such a way as to be completely embedded in said fire-proof compound.

Said baffle is generally formed by a thin aluminum foil, about 0.03 to 2 mm and preferably about 0.05 to 0.10 mm.

As already mentioned above, FIG. 1 pertains to an embodiment of a fire-break according to the invention for passing through a hollow element from platic material.

However such an element may be comprised of any material whatsoever, such as for example a heatsetting or thermoplastic material, or a material which does or does not conduct heat, notably glass, steel, copper, zinc, etc.

In this embodiment, said flange 3 is mounted against the outer surface of said element, preferably by means of a fire-proof compound, to insure the tightness between element and flange. Said flange 3 comprises in sequence, a first layer from fire-proof compound 5 to insure such tightness, an aluminum foil 4 extending all about element 1, followed by a further compound layer 6, a rock-wool layer 7, and an outer or final layer 8 from fire-proof compound which also extends over that flange side edge which is opposite to the edge applied against wall 2 as shown in 9.

To insure sealing between the flange and wall, it is also very useful to provide between wall and flange such a compound layer 10 which is applied either directly before arranging the flange about element 1, or directly over the corresponding flange side edge when arranging said flange, in such a way that the compound still be sticky.

It is thus required that the fire-proof compound adhesively connects the flange both to wall 2 and hollow element 1.

Figure 2:
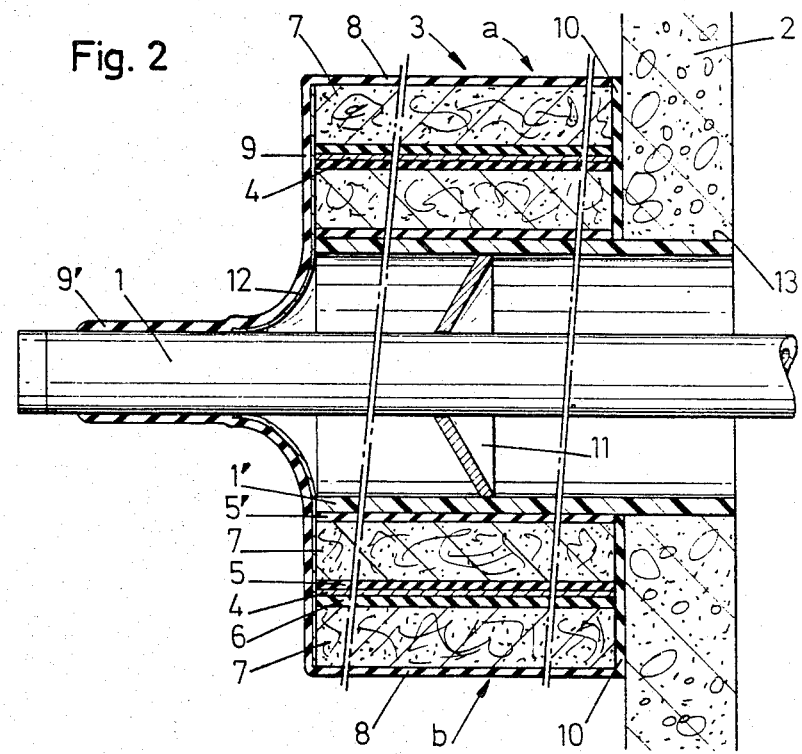
FIG. 2 is a similar view of another embodiment of a fire-break according to the invention, as mounted about a steel tube which may undergo substantial expansions along lengthwise and cross-wise directions.

FIG. 2 pertains to a fire-break according to the invention which is particularly suitable for passing through a wall, an element which might be subjected to relatively substantial lengthwise and/or cross-wise displacements and/or expansions. Such an element may for instance be a steel line through which flows a fluid the temperature of which may vary within wide limits. Such a line may according to the fluid nature, undergo very substantial expansions which may reach in some cases, a magnitude of about 10 cm.

It may also be a metal pipe with some length, which is subjected on the outside to a very varying heat action, for example due to the sun, said pipe having a relatively high expansion rate and extending along a geometrical pattern that requires free hanging of said pipe.

In such an embodiment, said flange 3 extends some distance away about element 1 to let the element free to move and expand along lengthwise and cross-wise directions with the required magnitude.

At least one flexible and compressible plug 11, such as a diaphragm from a substantially incombustible and gas-tight material, is arranged inside flange 3 about element 1, to insure sealing between said flange 3 and element 1, without hampering the element movement for example due to expansion thereof. It is useful for said plug to have enough resiliency to be able to follow the movement of hollow element 1 while retaining the tightness between element and flange.

In practice, such a plug 11 is generally arranged adjacent each end of flange 3, inside same.

In the case of a flange which is mounted some distance way from element 1 as in the embodiment shown in FIG. 2, the flange is mounted preferably by means of a fire-proof compound layer 5', on a hollow element 1' which is for example similar to element 1 as shown in FIG. 1. Said hollow element 1' has a large enough cross-section relative to center element 1 so as to extend some distance away around said center element and thus allow the displacement thereof due for example to expansion.

Consequently, the spacing between element 1 and flange 3 generally lies between 1 and 10 cm, and preferably between 2 and 5 cm.

In the embodiment as shown in FIG. 2, the flange 3 is provided at the end thereof opposite that end applied against wall 2, with a flexible seal flap 12 which extends in the shape of a truncated cone outside said flange. Said flap is secured against element 1 by means of a fire-proof compound layer 9' which extends from compound layer 9 over part of the outer tube surface, lying outside the flange.

The flap 12 may for instance be comprised of glass fiber cloth.

The baffle 4 lies some distance away from element 1' inside rock-wool layer 7, even if it is quite possible to provide said baffle 4 adjacent element 1' as in the embodiment as shown in FIG. 1.

Moreover it would be possible to provide a plurality of succeeding baffles embedded in fire-proof compound and separated from one another by a rock-wool layer. It would also be possible to consider a combination of the embodiments as shown in FIGS. 1 and 2.

It has been noticed that the presence of one or a plurality of baffles of the above-defined type allows to largely increase the performance under fire, particularly when the hollow element 1 in the embodiment as shown in FIG. 1, may burn or melt under the action of heat and thus disappear partly at least, as it is the case for instance with a plastic, thermoplastic or thermosetting material. Such rather unexpected favourable result appears to result from a three-way function performed by said baffle.

Indeed during a first step, as the fire starts, the baffle would have a restraining function by generating a cool zone inside the flange and preventing flowing through of steam originating from the compound, which might cause small channels through the flange towards the outer surface thereof.

During a second step, as the flange temperature rises, the element 1 gets hot and the part thereof adjacent to the wall melts, burns and is destroyed. This results in the flange being directly subjected to heat.

Due to the presence of said baffle 4 protected by the fire-proof compound layer 5, cracking of the flange is prevented. Moreover said baffle 4 reflects heat somewhat, which slows down the temperature rise of said flange.

During a third step, that part of baffle 4 adjacent the wall which is exposed the most to heat, melts in turn. Consequently the heat bridges formed by said baffle are cut-off, in such a way that the heat conveyed sidewise by said baffle to outside the flange, is minimized in spite of the conducting properties thereof.

Such a three-way action results in substantially slowing-down the temperature increase of the flange as the fire starts, relative to a flange which is not provided with such a baffle.

The element 1 may either be embedded in wall 2 as shown in FIGS. 1 and 2, or mounted in an opening provided therein.

In either case, when the wall is made from brickwork or concrete, said wall should preferably have a minimum thickness of 150 mm.

Moreover when the element passes through the wall by means of an opening which has a cross-section which is larger than the outer cross-section of said element, a panel from substantially incombustible material should be used to seal the space inside the opening between the element and the opening edges.

When said panel is a rock-wool cushion, such panel should preferably have a thickness of 150 mm and be applied against the opening or inside same about the element before arranging the flange.

Some practical test results are given hereinafter to show more concretely the advantages of the fire-break according to the invention.

First test type

These tests have been made with an assembly as shown in FIG. 1, in which said element 1 was comprised of a polyvinyl chloride pipe with an inner diameter of 160 mm and a length of 1050 mm from the wall. Said pipe was embedded horizontally in a vertical wall from concrete with 150 mm thickness, and was closed at the end thereof opposite the wall.

Said flange 3 was comprised in sequence (a) of an inner layer from a fire-proof compound in which were embedded two superimposed aluminum foils of 50 $\mu$ thickness, separated from one another by a 4 mm layer from said compound, (b) a rock-wool layer with 50 mm thickness, and (c) an outer final layer also from said fire-proof compound with 2 mm thickness.

A compound layer with 2 to 4 mm thickness was also provided between wall and flange, as well as on the opposite flange edge.

The overall width of the flange was 500 mm and a plug 14 from substantially incombustible material was provided inside that end of pipe 1 opposite to the wall.

A fire has been simulated by means of a blowtorch held along the pipe axis, on that side opposite to the wall relative to the flange, with a 300 mm spacing from said wall, the flame being directed towards the pipe. The mean temperature inside the flame did lie in the range of 800° 1 C.

Temperature measurings in relation to the time have been made downstream of the flange on the one hand, on the pipe surface, and on the other hand at a depth of some 50 mm inside the pipe.

| 1. Results from the measurings on the pipe surface. | | | | | | | | |
|---|---|---|---|---|---|---|---|---|
| time in minutes | 5' | 10' | 15' | 30' | 60' | 120' | 150' | 180' |
| $t_A°$ | 120 | 110 | 105 | 130 | 132 | 130 | 144 | 160 |
| $t_B°$ | 80 | 60 | 70 | 65 | 80 | 85 | 95 | 120 |
| $t_C°$ | 60 | 90 | 90 | 95 | 90 | 90 | 108 | 110 |

$t_A°$: temperature where the pipe comes out of the flange, upper side.
$t_B°$: temperature where the pipe comes out of the flange, lower side.
$t_C°$: temperature 450 mm from that location where the pipe comes out of the flange, upper side.
"time in minutes": means the moment after starting of the blow-torch when the temperature is measured.

| 2. Results from the measurings inside the pipe. | | | | | | |
|---|---|---|---|---|---|---|
| time in minutes | | 10' | 20' | 30' | 75' | 90' |
| $t_1°$ | | 300 | 310 | 300 | 300 | 260 |
| $t_2°$ | | 220 | 200 | 210 | 210 | 200 |
| $t_3°$ | | 140 | 150 | 150 | 140 | 120 |
| $t_4°$ | h | 210 | 200 | 180 | 180 | 160 |
| | m | 150 | 160 | 150 | 150 | 140 |
| | b | 160 | 170 | 160 | 140 | 140 |
| $t_5°$ | | 120 | 140 | 120 | 130 | 120 |

The measurings have been made at a 50 mm depth inside the pipe.
$t_1°$: temperature where the pipe comes out of the flange, at a 50 mm depth from the upper side.
$t_2°$: temperature at a distance of 450 mm from the location where the pipe comes out of the flange, at a 50 mm depth from the upper side.
$t_3°$: temperature at a distance of 450 mm from the location where the pipe comes out of the flange, at a 50 mm depth from the lower side.
$t_4°$: temperature at a distance of 250 mm from the location where the pipe comes out of the flange at a 50 mm distance respectively from the upper side (h), half-way side wise (m), and lower side (b).
$t_5°$: temperature where the pipe comes out of the flange, 50 mm from the lower side.

During these tests it has been noticed that after 45 minutes, there appears a 5 mm sagging in the top pipe portion, at a distance of 130 mm from the location where the pipe comes out of the flange; after 75 minutes such sagging becomes 10 mm and then remains constant to the end of the test.

Similar tests have been made on a fire-break without aluminum foils.

It has been noticed that the temperature in the measuring points did rise much faster at the start of the tests. For instance the temperature in location $t_4°$ did already reach 150° C. after 10 minutes to then fluctuate about a mean value of 145° C. during the first hour and finally reach 160° C. after 150 minutes.

These tests thus confirm the restraining action of the baffle during the first step of the tests.

Second test type

These tests have been made with an assembly as shown in FIG. 2, in which said element 1 was comprised of a steel tube with an inner diameter of 50 mm. Said tube was closed at a distance of 700 mm from the wall.

The flange was similar to the flange in the first type of tests with two aluminum foils and was mounted around the steel tube on a polyvinyl chloride pipe with an inner diameter of 120 mm and a length corresponding to the flange width, that is thus 500 mm.

The space between tube and flange was closed at that flange end which lies opposite the wall, with a flap made from a glass cloth, and a diaphragm was mounted inside said space to insure additional sealing between said tube and flange.

A fire has been simulated in the same way as for the first test type.

It has been noticed that the temperature of the steel tube where said tube comes out of the flange, did increase after 5 minutes substantially linearly with the time, to reach a temperature of 107° C. after 3 hours.

These tests as well as other tests made according to standards NBN 713,020 made it possible to determine rather unexpectedly, that there is a very narrow relation for a predetermined fire performance, between the inner diameter and the width of the flange for a given thickness thereof.

It was thus possible to draw a diagram on the basis of the first test type as described hereinabove.

Figure 3:
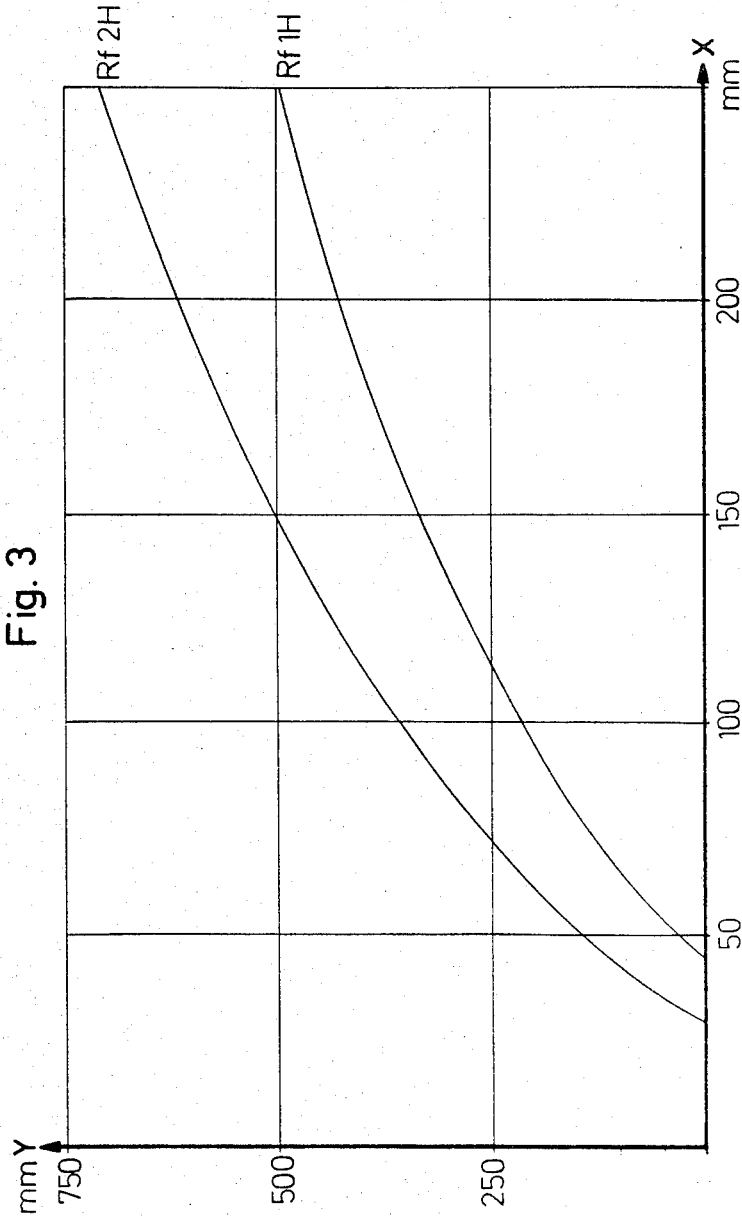
FIG. 3 shows a diagram showing the relation between the diameter of a hollow element and the width of the flange.

Said diagram is shown in FIG. 3. On the Y-axis is given the flange width (mm) and on the X-axis the inner diameter (mm) of a pipe the flange is mounted on. The curve Rf 1 H corresponds to fire resistance for one hour, while the curve Rf 2 H corresponds to fire resistance for 2 hours according to the standards NBN 713,020.

It is thus noticed for example that for a 100 mm diameter pipe, the flange width should be 225 mm for resisting to the fire for 1 hour, and 360 mm for resisting to the fire for 2 hours.

These curves have been drawn for flanges with a 50 mm thickness. When the inner diameter of the flange is 250 mm or more, it might be useful to increase the flange thickness up to 75 mm for example.

It must be understood that the invention is in no way limited to the above embodiments and that many changes may be brought therein without departing from the scope of the invention as defined by the following claims.

For instance one and the same flange may surround simultaneously a plurality of hollow elements and the incombustible material and fire-roof compound being used may be of different natures.

Instead of rock-wool coated with fire-proof compound, use might for example be made of a substantially rigid incombustible material, such as "Pical", which is mounted when required against the element by means of a flexible, substantially compressible gasket which insures the necessary sealing, such as an asbestos-base gasket.

On the other hand, tests have been shown that the flange might be mounted on any side of the wall, as the fire performances are substantially independent of the flange location relative to the fire. Consequently, the flange may lie on that wall side opposite to the fire as in the above-described tests, or on the same side as the fire relative to the wall.

In some cases, it might also be possible to provide a flange on either side of the wall, or a flange passing through the wall. It is then required to use the diagram, to add the thicknesses of both flanges.

When inside said hollow element 1 occurs a draught or suction for a gas such as air, notably in the case of a ventilation duct, there is advantageously provided inside said duct, a flap or similar closure means allowing to plug or seal said element when a fire breaks out, to thus cut-off said draught or suction. Such a door has been shown in FIG. 4, in 14.

Closing of said door preferably occurs automatically under the control for example of a fire sensor not shown in FIG. 4.

A plurality of succeeding doors might possibly be provided.

Said door or doors have actually a function which is somewhat similar to the function of the plugs or diaphragms as shown in FIG. 2.

Unexpectedly such doors do not have to show fire performances in the way of the known fire-breaking flaps or gates. It is indeed sufficient for the doors to prevent the passage or draught inside said hollow element 1.

In some cases it migh be useful to provide such flaps even inside hollow elements 1 in which under normal conditions, no draught, passage or suction occurs, but in which such a phenomenom might occur in the case of a fire. Such a danger might for example be present with pipes having large cross-sections.

I claim:

1. A fire-break for passing a hollow element, such as a pipe, sleeve or tube through a building wall, partition or ceiling, comprising:
    an elongated flange formed from a substantially incombustible material mounted about the hollow element and extending to the wall on at least one side thereof, said flange including,
    a first layer of a fire-proof material extending to said element and on said wall;
    a second layer of incombustible fibers disposed on said layer; and
    at least one closable door means mounted within said hollow element and provided with means for closing the door means to block air flow within said hollow element in response to a fire.
2. The fire-break of claim 1, wherein the incombustible fibers are rock-wool.
3. The fire-break of claim 1, wherein the thickness of the flange in the radial direction is between 3 and 10 cm.
4. The fire-break of claim 1, wherein the length of the flange along the axial direction of the hollow element is between 2 and 6 times the inner diameter of the hollow element.
5. The fire-break of claim 1, wherein the flange further includes at least one baffle of a gas-tight material disposed about the first layer of incombustible material.
6. The fire-break of claim 5, wherein the baffle material has a melting point lower than 900° C.
7. The fire-break of claim 6, wherein the baffle is an aluminum foil.
8. The fire-break of claim 1, further including a hollow member having a diameter larger than the hollow element disposed through the wall opening and said flange about the hollow element and spaced apart therefrom, and a resilient diaphragm disposed within said hollow member having an opening therethrough for receiving said hollow element to permit expansion and displacement of the hollow element and maintain said hollow member spaced apart from the hollow element, and
    a sealing flap of incombustible material extending from the end of said flange away from said wall to the outer surface of the hollow element.
9. The fire-break of claim 8, further including a second layer of incombustible fibers disposed between said baffle and said hollow element.
10. The fire-break of claim 8, wherein said hollow member is a length of plastic pipe.
11. The fire-break of claim 8, wherein the distance between said hollow element and said flange is between 1 and 10 cm.
12. The fire-break of claim 8, wherein the distance between said hollow element and said flange is between 2 and 5 cm.

* * * * *